US012765456B2

(12) United States Patent
Panzini et al.

(10) Patent No.: US 12,765,456 B2
(45) Date of Patent: Oct. 20, 2026

(54) METHOD OF CONTROLLING AN AGRICULTURAL MACHINE

(71) Applicant: CNH Industrial Brasil Ltda., Bairro Vale do Sereno (BR)

(72) Inventors: Bruno Sardelli Panzini, Piracicaba (BR); Marcos Ikeguchi Ohira, Piracicaba (BR); João Augusto Marcolin Lucca, Piracicaba (BR); Marco Aurélio Ramos Pereira, Piracicaba (BR)

(73) Assignee: CNH Industrial Brasil Ltda., Nova Lima (BR)

( * ) Notice: Subject to any disclaimer, the term of this patent is extended or adjusted under 35 U.S.C. 154(b) by 285 days.

(21) Appl. No.: 18/756,041

(22) Filed: Jun. 27, 2024

(65) Prior Publication Data

US 2025/0000021 A1 Jan. 2, 2025

(30) Foreign Application Priority Data

Jun. 30, 2023 (BR) ...................... 10 2023 013198 0

(51) Int. Cl.
*A01D 41/127* (2006.01)
*A01D 45/10* (2006.01)

(52) U.S. Cl.
CPC .......... *A01D 41/127* (2013.01); *A01D 45/10* (2013.01)

(58) Field of Classification Search
CPC .............................. A01D 41/127; A01D 45/10
See application file for complete search history.

(56) References Cited

U.S. PATENT DOCUMENTS 5,995,895 A 11/1999 Watt et al.
9,696,162 B2 7/2017 Anderson
10,255,670 B1 * 4/2019 Wu et al. .............. H04N 7/183
11,212,954 B2 1/2022 Maeder et al.
2022/0110255 A1 4/2022 Vandike et al.

* cited by examiner

*Primary Examiner* — Brodie J Follman
(74) *Attorney, Agent, or Firm* — Dority & Manning, P.A.

(57) ABSTRACT

The present invention refers to a new method of controlling agricultural machines, more particularly agricultural machines for harvesting tall and stalky plants, being designed to optimize working conditions in view of the previous mapping of existing failures in plantation fields to, with this, obtain an increase in productivity and income from harvesting operations in the field. More particularly, the method comprises steps configured to adjust the operating parameters of the agricultural machine (10), such as the travel speed of the machine and the operating speed of the base cutter assembly (42) to thereby obtain a reduction in consumption of energy, but mainly to avoid strangulation and compromising the cut roots.

15 Claims, 4 Drawing Sheets

METHOD OF CONTROLLING AN AGRICULTURAL MACHINE

CROSS-REFERENCE TO RELATED APPLICATIONS

The present application is based upon and claims the right of priority to Brazilian Patent Application No. BR 10 2023 013198 0, filed Jun. 30, 2023, the disclosure of which is hereby incorporated by reference herein in its entirety for all purposes.

FIELD OF INVENTION

The present invention relates, in general, to a new method of controlling machines, more particularly, agricultural machines intended for harvesting tall and stalky plants, such as sugarcane and sweet sorghum. More specifically, this new control method was developed to improve working conditions of the machines, but mainly to optimize the machine operating parameters based on previous mapping of existing crop failures.

BACKGROUND OF THE INVENTION

Numerous models of agricultural equipment and machines designed and developed to provide increased productivity in harvesting of different types of vegetable crops are known in the state of the art, for example, grain combine harvesters, forage harvesters, and also, agricultural machines for harvesting the so-called tall and stalky plants, such as sugarcane and sweet sorghum.

Machines designed to harvest these tall and stalky plants are designed and developed to allow the harvesting of this specific type of crop, because their intrinsic characteristics require specific conditions for their adequate processing, from cutting to transfer to transshipments, buckets and/or trailers.

In this context, it is known that these agricultural machines for harvesting tall and stalky plants comprise a chassis whose front portion bears a set of mechanisms configured to promote the concentration and cutting of plant stalks so that the material is harvested and conveyed towards a series of conveyor and chopper rollers responsible for conveying and chopping the sugarcane into billets, which are then transferred to transshipments and/or trailers via an elevator assembly.

As must be appreciated by those skilled in the art, it is common that in many planting regions there are failures caused by uneven plant growth, either due to seed distribution and sowing conditions or due to soil characteristics and/or climatic conditions that can, in some way, influence and interfere with the growth and development of plantations.

Therefore, these crop failures in the field, under certain conditions, end up causing a negative impact to the operating conditions of agricultural machines, since it is quite common for machines to work under conditions that ignore these failures or, in most cases, require operators having the expertise of being able to identify that he/she is getting closer to said crop failures and, then, try to adjust some operating parameters of the machine with the aim of optimizing operations and working conditions.

However, despite the expertise of the operators, as must be appreciated by those skilled in the art, one of the inconveniences observed in field operations carried out by agricultural machines for harvesting tall and stalky plants of the prior art is related to the concentration of stalks usually present at the borders of the aforementioned crop failures. These concentrations have a high density and cause more severe shocks to the base cutting discs, causing strangulation of the roots of tall and stalky plants and, as a result, the dimensions of the aforementioned crop failures increase annually, and reduce the productivity of the field in general. Furthermore, these shocks caused by the contact of the base cutting discs with the high concentration of stalks end up spreading throughout the machine and can cause discomfort to operators inside the cabin.

Additionally, depending on the dimensions of these crop failures in the field, agricultural machines end up consuming more energy than they actually should, since, normally, the operating parameters remain in the same conditions in an area where productivity is relatively low. Moreover, it is observed that in these areas of low productivity, agricultural machines end up moving at the same speed as they were moving in the productive areas and, consequently, interfering with the travel and working time of the machine, which, in the end, affects the general performance of operations.

Therefore, it is possible to observe that agricultural machines for harvesting tall and stalky plants in the state of the art present some inconveniences and operating limitations, especially in areas of the field that present crop failures, which restrict and interfere with the performance of work in the field, but they can also cause root damage that leads to an increase in crop failures over the years and in future harvests. In view of these reasons, it is interesting to provide means and operational conditions that take into account the existence of crop failures in the field so that harvesting work is more efficient and productive for farmers.

Hence, these are, among others, the problems, objectives, and solutions that are intended to be overcome and achieved by the development of the present invention.

DESCRIPTION OF THE INVENTION

In this sense, in accordance with the above, the present invention aims to provide a new proposal for a method of controlling a machine, and such new method was designed and developed to obtain a practical, functional, and highly efficient solution to the inconveniences, problems, and limitations identified in the prior art, as mentioned above.

More particularly, it is one of the objectives of the present invention provide a new method of controlling agricultural machines that is formed by technical, constructive and functional characteristics configured to obtain the optimization of the operating parameters of the equipment, cutting and harvesting mechanisms of the agricultural machine, based on previous mapping of crop failures in the field.

More objectively, and with the purpose of achieving the technical and functional effects summarized above, among others, the present invention refers to a method of controlling agricultural machines that have speed control and comprise a memory to receive and store information relating to the mapping of crop failures, and a base cutting assembly, wherein the method initially comprises the steps of loading information relating to the mapping of crop failures and starting a harvesting operation in the field. Additionally, the method comprises the steps of:

i) identifying the position of the agricultural machine in the field;

ii) identifying the proximity of a crop failures;

iii.a) increasing the discs speed of the base cutting assembly;

iii.b) reducing the travel speed of the agricultural machine in the field;

iv) identifying the beginning of the crop failures;

v.a) reducing the discs speed of the base cutting assembly;

v.b) increasing the travel speed of the agricultural machine in the field;

vi) identifying the end of the crop failure;

vii.a) increasing the discs speed of the base cutting assembly;

vii.b) reducing the travel speed of the agricultural machine in the field;

viii) waiting for a time interval, configured to be sufficient to overpass the initial stalks disposed at the edge of the crop failure.

According to particular embodiments of the present invention, said steps (iii.a) and (iii.b) can be carried out when in proximity to the edge of the crop failure and, more specifically, before reaching the stalks of tall and stalky plants disposed at the edge of the crop failure. More specifically, the aforementioned steps (iii.a) and (iii.b) can be carried out around 1 second before reaching the concentration of plants disposed at the edge of the crop failure.

According to an embodiment of the present invention, the increase in discs speed of the base cutting assembly can be around of 10% in relation to the conventional speed of the machine. While the reduction in the travel speed of the agricultural machine in the field can represent something around of 5% of the speed in conventional mode.

In another embodiment of the method of the present invention, said step (v.a) can be carried out once the beginning of the crop failure is indicated, in this case, the discs speed of the base cutting assembly can be reduced. As for the aforementioned step (v.b), it can be carried out once the beginning of the crop failure is indicated, wherein the travel speed of the agricultural machine (10), in this case, can be increased by around of 10%.

According to the present invention, said steps (vii.a) and (vii.b) can be carried out once it is identified the end of the crop failure, more particularly, before reaching the stalks of tall and stalky plants disposed at the edge of the aforementioned crop failure. More particularly, the aforementioned steps (vii.a) and (vii.b) can be carried out around 1 second before reaching the concentration of plants disposed at the edge of the crop failure.

According to particular embodiments of the present invention, during said steps (vii.a) and (vii.b), the increase in the discs speed of the base cutting assembly can be about 10% in relation to the conventional speed, and the reduction in the travel speed of the agricultural machine in the field can be around of 5% of the speed in conventional mode.

According to a particular embodiment of the present invention, said time interval (ΔT1) of step (viii) needs to be sufficient to overpass the initial stalks positioned at the edge of the crop failure.

Additionally, after carrying out step (viii), the control method of the present invention, according to one embodiment, comprises step (ix), returning the working parameters to the conventional mode.

Furthermore, according to another possible and particular embodiment of the present invention, said step (iv), based on the characteristics of the crop failure, may also comprise the following steps:

iv.a) determining whether the crop failure requires a relatively small time interval (ΔT2);

iv.a1) if so, go to step (vi.a/vi.b);

iv.a2) if not, adjust the working parameters of the complementary mechanisms of the agricultural machine to economic mode, and proceed to step (v.a/v.b).

In yet another embodiment of the present invention, the control method may comprise, in step (vi), a step of checking whether the complementary mechanisms are in economical mode, if so, then it is necessary to return the work parameters of the complementary mechanisms to the working mode, said complementary mechanisms may be one or more of a tip cutter assembly (22), a row divider assembly (30), a conveyor roller assembly (44), a chopper assembly (50), a primary extractor assembly (54)/a secondary extractor assembly (78), an elevator assembly (52), and a hydraulic pump.

According to another particular embodiment of the present invention, said time interval (ΔT2) of step (iv.a) is previously set and configured to represent a period of time between 5 and 10 seconds.

BRIEF DESCRIPTION OF THE DRAWINGS

The characteristics, advantages and technical effects of the present invention, as indicated above, will be more adequately understood by a person skilled in the art from the detailed description below, made by way of example only, and not restrictive, and making reference to the schematic drawings attached, which.

DESCRIPTION OF EMBODIMENTS OF THE INVENTION

The invention will now be described with respect to its particular embodiments, making reference to the attached figures. Such figures are schematic, and their dimensions and/or proportions may not correspond to the reality, as they only aim to describe the invention in a didactic way. Furthermore, certain known and common construction details may have been omitted for greater clarity and conciseness in the description that follows. The reference numbers used are repeated throughout the figures to identify identical or similar parts. The terms eventually used such as "above", "below", "front", "back", "right", "left" etc. and variants thereof must be interpreted according to the orientation of FIG. 1.

Figure 1:
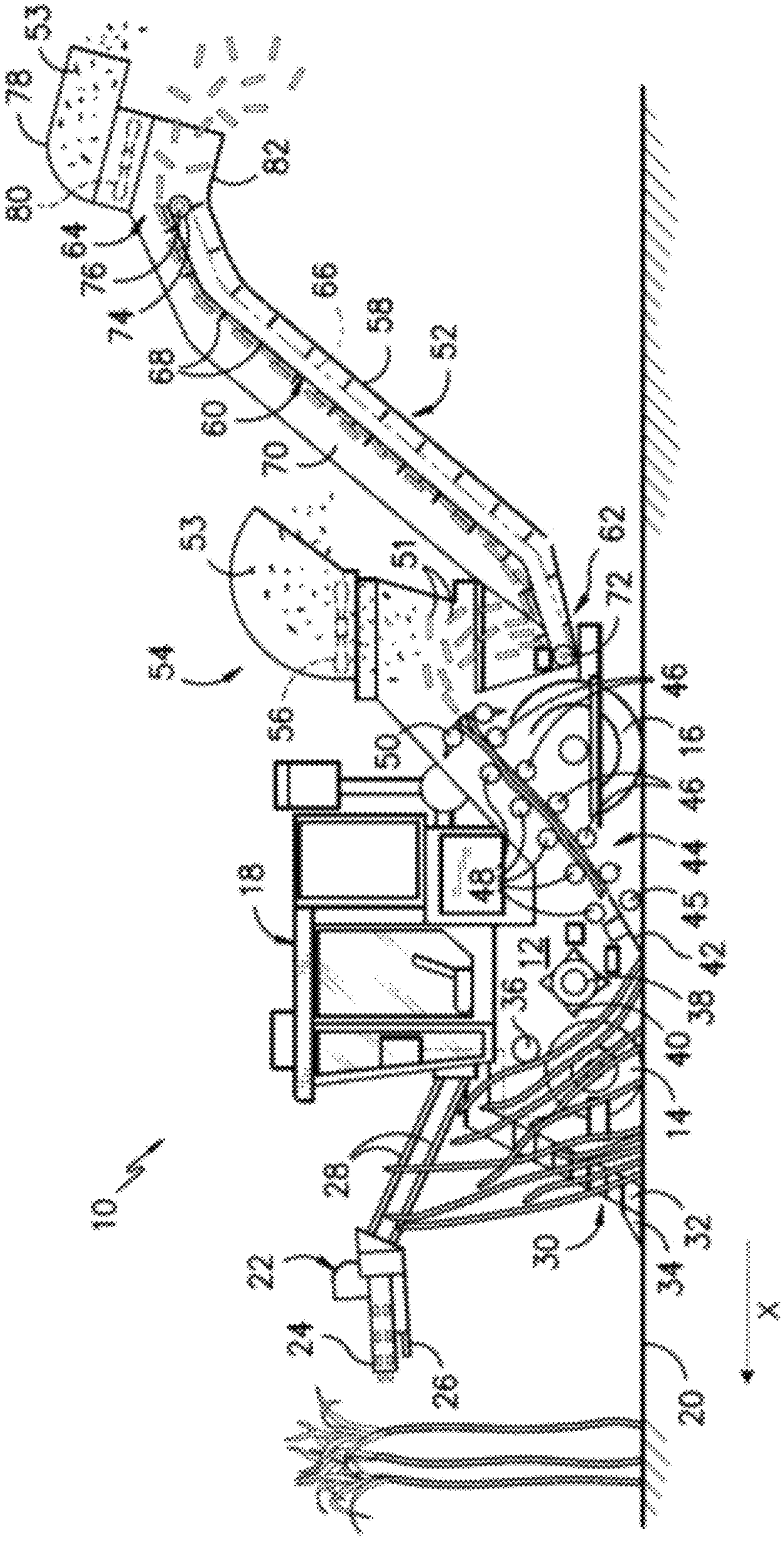
FIG. 1 is a schematic side view of an agricultural machine intended for harvesting tall and stalky vegetable crops, such as sugarcane and sweet sorghum, and which can perform the method according to the present invention.
Figure 2:
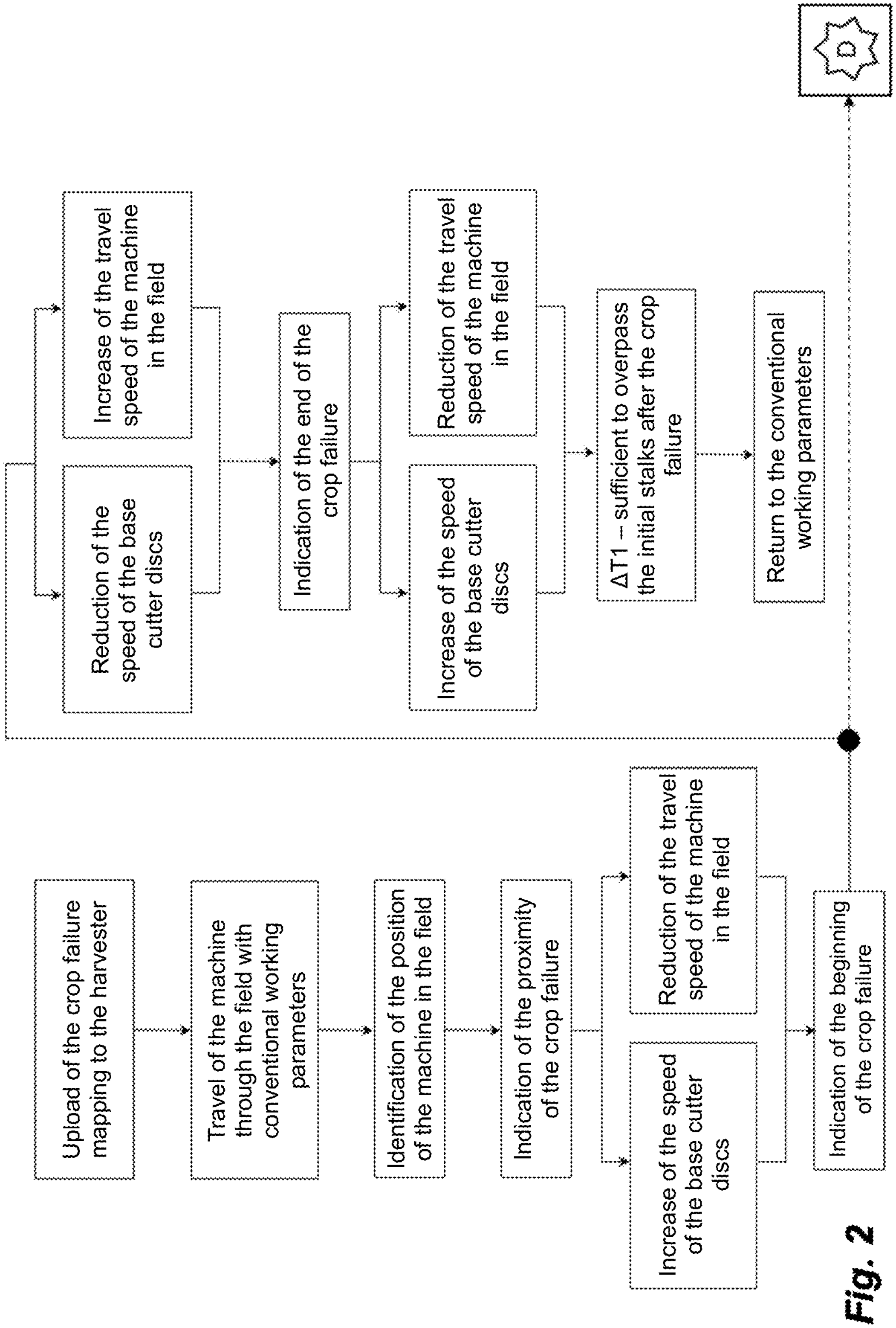
FIG. 2 is a flowchart of the method of controlling agricultural machines, according to an embodiment of the present invention.
Figure 3:
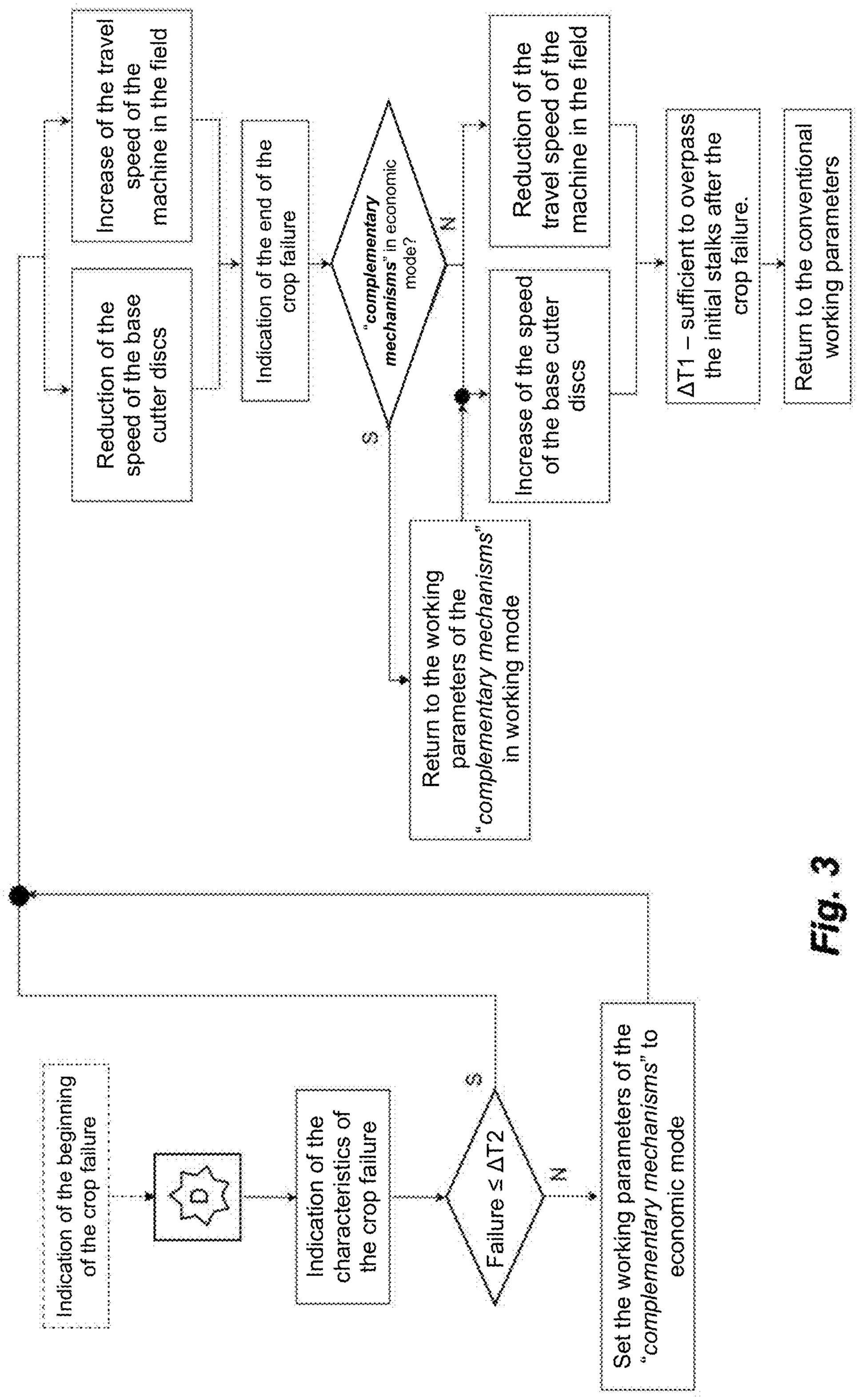
FIG. 3 shows another flowchart of the method of controlling agricultural machines, according to a particular configuration of the present invention.
Figure 4:
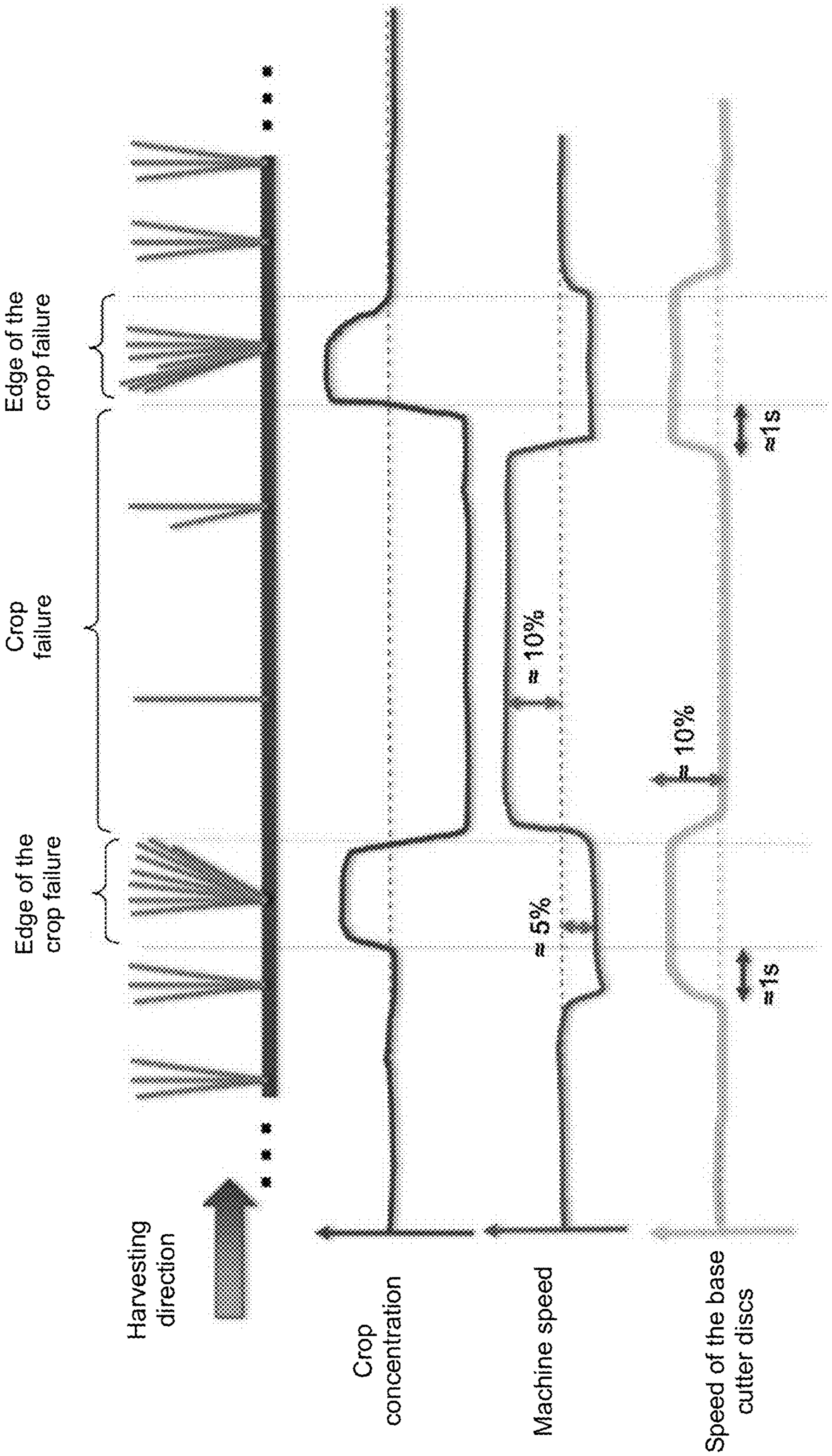
FIG. 4 is a schematic view of a tall and stalky vegetable crop with crop failures and the work condition of the machine in accordance to the method of the present invention.

Referring now to the drawings, and by way of contextualization of the present invention, FIG. 1 illustrates a side view of an embodiment of an agricultural harvester 10 according to aspects known in the state of the art, but capable of incorporating and executing the method according to the present invention. The harvester 10 is configured as a sugarcane harvester. However, in other embodiments, the harvester 10 may correspond to any suitable agricultural harvester known in the art, such as sorghum and energy-sugarcane.

As shown in FIG. 1, the harvester 10 includes a chassis 12, a pair of front wheels 14, a pair of rear wheels 16, and an operator cabin 18. The harvester 10 may also include a primary power source (e.g., an engine mounted on the chassis 12) that powers one or both pairs of wheels 14, 16 via a transmission (not shown). Alternatively, the harvester 10 may be a tracks-actuated harvester and therefore may include tracks driven by the engine mechanism in replacement of the illustrated wheels 14, 16. The engine mechanism may also actuate a hydraulic fluid pump (not shown) configured to generate pressurized hydraulic fluid to actuate various hydraulic components of the harvester 10.

Additionally, the harvester 10 may include various components for cutting, processing, cleaning and unloading sugarcane as the sugarcane is harvested from an agricultural field 20. For example, the harvester 10 may include a tipping cutter assembly 22 positioned on its front end to intercept the sugarcane as the harvester 10 travels in the forward direction represented by the arrow X. As shown, the tipping cutter assembly 22 may include both a gathering disc 24 and a cutting disc 26. The gathering disc 24 can be configured to gather the sugarcane stalks together so that the cutting disc 26 can be used to cut off the tip of each stalk. Generally, the height of the tipping cutter assembly 22 may be adjustable by means of a pair of arms 28 hydraulically raised and lowered as desired by the operator.

Additionally, the harvester 10 may include a row divider assembly 30 that extends upward and rearward from the field 20. In general, the row divider assembly 30 may include spiral feed rollers 32, also known as “lollipop”. Each feed roller 32 may include a soil pad 34 as its lower end assists the row divider assembly 30 in separating sugarcane stalks for harvest. Furthermore, as shown in FIG. 1, the harvester 10 may include a dropper roller 36 positioned near the front wheels 14 and a roller with protrusions 38 positioned behind the dropper roller 36. As the dropper roller 36 is rotated, the harvested sugarcane stalks are tipped over while the row divider assembly 30 gathers the crop stalks of the field 20 toward the interior of the agricultural machine 10. Additionally, as shown in FIG. 1, the roller with protrusions 38 may include a plurality of fins 40 intermittently mounted that assist in forcing the sugarcane stalks downwards. As the roller 38 is rotated during harvesting, the sugarcane stalks that were tipped over by the dropper roller 36 are separated and subsequently tipped over by the roller 38 as the harvester 10 continues to travel forward with respect to the field 20.

Further referring to FIG. 1, the harvester 10 may also include a base cutter assembly 42 positioned behind the roller 38. As is generally understood, the base cutter assembly 42 may include blades for cutting sugarcane stalks as the cane is harvested. The blades, located at the periphery of the assembly 42, can be rotated by a hydraulic-driven engine, for example, by the hydraulic system of the machine. Additionally, in various embodiments, the blades may be angled downward to cut the base of the sugarcane as it is tipped over by the roller 38.

Additionally, the harvester 10 may include a set of one or more conveyor rollers 44 located downstream of the base cutter assembly 42 to move the cut stalks of sugarcane from the base cutter assembly 42 along the processing trajectory. As shown in FIG. 1, a lifting roller 45 is arranged between the base cutter assembly 42 and the conveyor roller assembly 44, the purpose of which is to lift the cut sugarcane from the ground 20 and guide it to the conveyor roller assembly 44 which is formed by a plurality of lower rollers 46 and a plurality of upper rollers 48. As sugarcane is conveyed by the conveyor roller assembly 44, debris (e.g., rocks, dirt and/or similar) can also be conveyed or dropped through the lower rollers 46 onto the field 20.

Additionally, the harvester 10 may include a chopper assembly 50 located at the downstream end of the conveyor roller assembly 44 (e.g., adjacent to the rearmost lower and upper conveyor rollers 46, 48). In general, the chopper assembly 50 can be used to cut or chop harvested sugarcane stalks into smaller pieces or “fragments” 51 that may, for example, measure 15.24 centimeters (six inches), also called billets or stalk sections. The fragments 51 may then be propelled towards an elevator assembly 52 of the harvester 10 to be collected in an external receiver or storage device (not shown).

As is generally understood, pieces of waste 53 (e.g., dust, dirt, leaves, etc.) separated from the sugarcane fragments 51 may be expelled from the harvester 10 through a primary waste extractor assembly 54, which is located behind the chopper assembly 50 and is oriented to direct the waste 53 out of the harvester 10. Additionally, a fan 56 may be mounted on the primary extractor 54 to generate a suction force or vacuum sufficient to capture the waste 53 and force the waste 53 through the primary extractor 54. The waste 53 is then directed out and generally in the opposite direction of the harvester 10 through an outlet of the primary extractor 54. The separated fragments 51 and heavier than the waste 53 being expelled from the extractor 54, can then fall into the elevator assembly 52.

As shown in FIG. 1, the elevator assembly 52 may generally include an elevator housing 58 and an elevator 60 that extends within the elevator housing 58 between a lower proximal end 62 and an upper distal end 64. In general, the elevator 60 may include a chain or conveyor belt 66 and a plurality of paddles or flights 68 coupled to or evenly spaced on the chain 66. The flights 68 may be configured to hold the sugarcane fragments 51 on the elevator 60 as the fragments 51 are lifted towards the top of the elevator 70. Additionally, the elevator 60 may include lower and upper sprockets 72, 74 positioned around the proximal and distal ends 62, 64, respectively. As shown in FIG. 1, an elevator engine 76 may be coupled to one of the sprockets (e.g., the upper sprocket 74) to drive the chain 66, thereby allowing the chain 66 and flights 68 to move in an endless cycle between the proximal and distal ends 62, 64 of the elevator 60.

In addition, pieces of waste 53 (e.g., dust, dirt, leaves, etc.) separated from the sugarcane fragments 51 may be expelled from the harvester 10 through a secondary waste extractor assembly 78 coupled to the rear end of the elevator 58. As shown in FIG. 1, the secondary extractor assembly 78 may be located adjacent the distal end 64 of the elevator 60 and may be oriented to direct waste 53 out of the harvester 10. Additionally, a fan 80 can be mounted on the secondary extractor 78 to generate a suction or vacuum force sufficient to extract the waste 53 and force the waste 53 through the secondary extractor 78. The separated fragments 51, heavier than the waste 53 expelled through the extractor 78, may then fall from the distal end 64 of the elevator 60. Typically, the fragments 51 may fall through a discharge opening 82 of the elevator assembly 52 into an external storage device (not shown), such as a car, a transshipment, a bucket etc.

During the operation, the harvester 10 is driven across the agricultural field 20 to harvest sugarcane. Once the height of the tipping cutter assembly 22 is adjusted (if used) by means of the arms 28, the gathering disc 24 on the tipping cutter assembly 22 may be operated to gather the sugarcane tips together as the harvester 10 advances through the field 20, while the cutting disc 26 cuts the leafy tips of the sugarcane stalks to dump them along both sides of the harvester 10. As the stalks enter the row divider assembly 30, the pads 34 can configure the operation width to determine the amount of sugarcane that enters the inlet opening of the harvester 10, either in a fixed or adjustable manner. The lollipops 32 then gather the stalks together at the machine inlet to enable the dropper roller 36 to bend the stalks down in conjunction with the action of the roller with protrusions 38. Since the stalks are positioned at an angle as shown in FIG. 1, the base cutter assembly 42 can then cut the base of the stalks of the field 20. The cut stalks are then lifted by the lifting roller 45 and directed to the conveyor roller assembly 44.

The cut sugarcane stalks are conveyed backwards by the conveyor rollers 46, 48 which compress the stalks and harvested matter. At the downstream end of the conveyor roller assembly 44, the chopper assembly 50 cuts or chops the compacted sugarcane stalks into pieces or fragments 51. Conveyed waste 53 (e.g., dust, dirt, leaves, etc.) separated from the sugarcane fragments 51 are then extracted through the primary waste extractor assembly 54 using the suction or vacuum created by the fan 56. The separated/washed fragments 51 then fall onto the elevator assembly 52 and travel upwards by means of the elevator 60 from its proximal end 62 to its distal end 64. During normal operation, the elevator assembly 52 is moved to one side and, once the fragments 51 reach the distal end 64 of the elevator 60, the fragments 51 fall through the discharge opening 82 to an external storage device. Similar to the primary extractor 54, the waste is blown out of the harvester 10 through the secondary waste extractor assembly 78 with the assistance of the fan 80.

An agricultural machine 10, such as the one described above, can be, for example, a machine known in the state of the art, such as the sugarcane harvesters from CNH Industrial N.V. sold under the Case IH trademark.

The terms used herein such as harvester, harvesting machine and their variants are used interchangeably to indicate an agricultural machine intended for harvesting a vegetable crop and, in the case of this description, for harvesting tall and stalky plants, such as sugarcane, energy cane, sorghum, etc.

Therefore, considering the scenario contextualized above, and in accordance with the present invention, the new method of controlling an agricultural machine has a speed control and comprises a memory to receive and store information relating to the mapping of crop failures, a base cutting assembly, initially formed by uploading the mapping of crop failures previously generated through data collection technologies commonly known and adopted in the agricultural segment. Just for example purposes, among the countless technologies, there are those that use drones to capture images used for the virtual reconstruction of cultivation areas that include the identification of existing crop failures that are then combined with the respective positions determined according to the guidance given by GPS.

In this sense, it is possible to note that the mappings provided and loaded on the agricultural machines are generated to be able to provide, with precision, the locations and characteristics of the crop failures existing in that area where the harvesting operations will be carried out by the agricultural machine.

Then, after loading the information relating to the mapping of crop failures, the method of controlling a machine, according to the present invention, considers that the agricultural machine 10 is moving in the field and, at the same time, is performing its tasks in a condition in which the working parameters are in conventional mode, that is, all mechanisms are working under usual conditions, for example, the travel speed of the agricultural machine 10 in the field, the tipping cutter assembly 22, the row divider assembly 30, the base cutter assembly 42, the conveyor roller assembly 44, the chopper assembly 50, the primary and secondary extractor assemblies 54, 78, and the elevator assembly 52 are performing their tasks under normal operating conditions, such as in areas without crop failures.

In these initial operating conditions, the method of controlling agricultural machines of the present invention begins its harvesting operations in the field and starts to associate the current positioning of the agricultural machine in the field with the mapping of crop failures and, in this way, it starts to execute the following steps:

i) identifying the position of the agricultural machine 10 in the field;
ii) indicating the proximity of a crop failure;
iii.a) increasing the discs speed of the base cutting assembly 42;
iii.b) reducing the travel speed of the agricultural machine 10 in the field;
iv) indicating the beginning of the crop failure;
v.a) reducing the discs speed of the base cutting assembly 42;
v.b) increasing the travel speed of the agricultural machine 10 in the field;
vi) indicating the end of the crop failure;
vii.a) increasing the discs speed of the base cutting assembly 42;
vii.b) reducing the travel speed of the agricultural machine 10 in the field;
viii) waiting for a time interval (ΔT1), which is sufficient to overpass the initial stalks after the crop failure.

According to a particular embodiment of the present invention, steps (iii.a) and (iii.b) are carried out when in proximity to the edge of the crop failure, more specifically, before reaching the stalks of tall and stalky plants disposed at the edge of the crop failure. More specifically, according to a more particular embodiment, said steps (iii.a) and (iii.b) are executed around 1 second before reaching the concentration of plants disposed at the edge of the crop failure.

Furthermore, according to a possible embodiment of the present invention, the increase in the discs speed of the base cutting assembly 42 is about 10% in relation to the conventional speed, and the reduction in the travel speed of the agricultural machine 10 in the field is around of 5% of the speed in conventional mode.

Also, according to a particular mode of operation of the present invention, steps (v.a) and (v.b) are executed from the moment when the beginning of the crop failure is indicated and, thus, the discs speed of the base cutter assembly 42 can be reduced, and the travel speed of the agricultural machine 10 can be increased by around 10% in order to reduce the crossing time through said crop failure, which is a low productivity area.

The aforementioned steps (vii.a) and (vii.b) are carried out once it is identified the end of the crop failure, more specifically, before reaching the stalks of tall and stalky plants disposed at the edge of the crop failure. More especially, according to a more particular embodiment, these steps (vii.a) and (vii.b) are carried out around 1 second before reaching the concentration of plants disposed at the edge of the crop failure.

Additionally, according to another possible embodiment of the present invention, the increase in the discs speed of the base cutter assembly 42 is about 10% in relation to the conventional speed, and the reduction in the travel speed of the agricultural machine 10 in the field is around of 5% of the speed in conventional mode.

The time interval (ΔT1) of step (viii) must be sufficient to overpass the initial stalks positioned at the edge of the crop failure, which present a high concentration and, therefore, require more cautious operational care so that the roots of the cut plants are not strangled and damaged, which would result in an increase in the size of the crop failure in the next harvest.

According to the present invention, after step (viii) where the machine waits a time interval (ΔT1) sufficient to overpass the initial stalks after the crop failure, the method also comprises step (ix), returning the work parameters to the conventional way.

Optionally, according to a complementary embodiment of the method of the present invention, at the moment when the beginning of the crop failure is indicated (step iv), based on the information provided by the mapping of the crop failures, it is possible to determine the characteristics of said failure and, thus, it is possible to determine the time that the agricultural machine will need to cover the entire failure. In this sense, the method of controlling agricultural machines, according to the present invention, may also comprise the following complementary steps:

iv.a) determining whether the crop failure requires a relatively small time interval (ΔT2);

iv.a1) if so, go to step (vi.a/vi.b);

iv.a2) if not, adjust the working parameters of the complementary mechanisms of the agricultural machine 10 to economic mode, and proceed to step (v.a/v.b).

In this optional configuration of the method of the present invention, at moment of indicating the end of the crop failure (step vi), the method must also include a step of checking whether the complementary mechanisms are in economical mode, if so, then it is necessary to return the work parameters of the complementary mechanisms to the working mode.

As must be appreciated by those skilled in the art, said complementary mechanisms can be any mechanisms installed on agricultural machines that are in addition to the base cutter assembly, and the engine responsible for controlling the speed of the machine in the field. In this case, for example, these complementary mechanisms may be the tipping cutter assembly 22, row divider assembly 30, conveyor roller assembly 44, chopper assembly 50, primary extractor assembly 54/secondary extractor assembly 78, elevator assembly 52, hydraulic pump etc.

According to a particular embodiment of the present invention, the time interval (ΔT2) of step (iv.a) can be previously adjusted and configured to represent, for example, a period of time between 5 and 10 seconds. As should be appreciated by those skilled in the art, this step can be subdivided so that the working parameters of the complementary mechanisms are adjusted according to the convenience and expertise of operators and farmers.

As an example, if the aforementioned failures represents a ΔT2 on the order of 10 seconds, it is possible to adjust the work parameters of the extractors to perform their operations with a reduction on the order of 25% while the discs of the base cutter assembly work with a reduction on the order of 30%. In another situation, if the aforementioned ΔT2 represents an interval greater than 10 seconds, it is possible to adjust the mechanisms so that they work in a condition in which there is a reduction on around of 50% in capacity, in order to obtain a consumption reduction of substantial energy in an area of low productivity.

In this sense, as can be seen, the present invention is capable of providing particularly advantageous conditions that help the driving of agricultural machines in the field, especially based on the mapping of crop failures in order to obtain a significant increase in productivity and yield of operations in the field, considering that the machines begin to perform their tasks under appropriate conditions in the effectively productive areas, and are capable of optimizing the working conditions of their mechanisms to obtain a reduction in energy consumption, as well as more quickly transposing these areas of low productivity.

Furthermore, it is noted that the method of the present invention can manage and control the work operations of agricultural machines in order to ensure adequate cutting of the stalks that grow on the edges of the failures, with such edges proving to be critical portions that, if not treated properly, they may compromise subsequent crops due to the strangulation of the roots and the consequent increase in the general dimensions of the aforementioned crop failures.

It is worth highlighting that the effects and advantages of the present invention are obtained mainly due to the combined action of the previous mapping of crop failures of the field with the geo-positioning of the agricultural machines, so that the machine control systems are able to execute and signal, if applicable, work operations and, with it, efficiently assist machine operators to increase productivity and performance in the field.

Finally, considering everything discussed above, it is important to highlight that the present description aims only to present and define by way of example particular embodiments of the new method of controlling agricultural machines 10, according to the present invention. Therefore, as those skilled in the art must appreciate, various modifications and combinations of equivalent elements and details are possible without thereby departing from the scope of protection defined by the attached claims.

The invention claimed is:

1. A method for controlling an agricultural machine, the method comprising:

i) receiving information related to a mapping of crop failures;

ii) initiating a harvesting operation within a field using a base set of working parameters for the agricultural machine;

iii) identifying a position of the agricultural machine within the field;

iv) identifying a proximity of a crop failure relative to the agricultural machine based on the mapping of crop failures and the position of the agricultural machine;

v) responsive to identifying the proximity of the crop failure:

v.a) increasing a disc speed of a base cutting assembly of the agricultural machine;

v.b) reducing a travel speed of the agricultural machine within the field;

vi) identifying a beginning of the crop failure;

vii) responsive to identifying the beginning of the crop failure:

vii.a) reducing the disc speed of the base cutting assembly;

vii.b) increasing the travel speed of the agricultural machine within the field;

viii) identifying an end of the crop failure;

ix) responsive to identifying the end of the crop failure:

ix.a) increasing the disc speed of the base cutting assembly;

ix.b) reducing the travel speed of the agricultural machine within the field;

x) returning to the base set of working parameters for the agricultural machine after waiting a time interval sufficient to overpass an edge of the end of the crop failure.

2. The method according to claim 1, wherein method elements (v.a) and (v.b) are carried out when approaching an edge of the beginning of the crop failure.

3. The method according to claim 2, wherein method elements (v.a) and (v.b) are carried out about 1 second before reaching the edge of the beginning of the crop failure.

4. The method according to claim 1, wherein the increase in the disc speed of the base cutter assembly about 10% in relation to a base disc speed of the base set of working parameters.

5. The method according to claim 1, wherein the reduction in the travel speed of the agricultural machine is about 5% of a base travel speed of the base set of working parameters.

6. The method according to claim 1, wherein method element (vii.a) is carried out immediately upon identification of the beginning of the crop failure.

7. The method according to claim 1, wherein method element (vii.b) is carried out immediately upon identification of the beginning of the crop failure, with the travel speed of the agricultural machine being increased by about 10%.

8. The method according to claim 1, wherein method elements (ix.a) and (ix.b) are carried before reaching an edge of the end of the crop failure.

9. The method according to claim 8, wherein method elements (ix.a) and (ix.b) are carried out about 1 second before reaching the edge of the end of the crop failure.

10. The method according to claim 8, wherein the increase in the disc speed of the base cutter assembly about 10% in relation to a base disc speed of the base set of working parameters and the reduction in the travel speed of the agricultural machine is about 5% of a base travel speed of the base set of working parameters.

11. The method according to claim 1, wherein the time interval is sufficient to overpass stalks positioned on the edge of the end of the crop failure.

12. The method according to claim 1, wherein method element (vi) further comprises:

vi.a) determining whether the crop failure requires a given time interval;

vi.a1) if so, performing method elements (ix.a) and (ix.b);

iv.a2) if not, adjusting one or more working parameters of complementary mechanisms of the agricultural machine to an economic mode, and performing method elements (vi.a) and (vi.b).

13. The method according to claim 11, wherein method element (viii) further comprises checking whether the complementary mechanisms are in the economical mode, if so, returning work parameters of the complementary mechanisms to a working mode.

14. The method according to claim 11, wherein the complementary mechanisms are at least one of a tipping cutter assembly, a row divider assembly, a conveyor roller assembly, a chopper assembly, a primary extractor assembly, a secondary extractor assembly, an elevator assembly, or a hydraulic pump.

15. The method according to claim 11, wherein the given time represents a period of time between 5 and 10 seconds.

* * * * *